United States Patent [19]

Connolly

[11] 4,327,488
[45] May 4, 1982

[54] HAND HELD GLASS CUTTER

[75] Inventor: Peter Connolly, Parsippany, N.J.

[73] Assignee: Red Devil Inc., Union, N.J.

[21] Appl. No.: 180,327

[22] Filed: Aug. 22, 1980

[51] Int. Cl.³ .............................................. C03B 33/12
[52] U.S. Cl. ................................................... 30/164.95
[58] Field of Search ................... 30/164.95, 164.9, 314

[56] References Cited

U.S. PATENT DOCUMENTS

| | | | |
|---|---|---|---|
| 1,201,515 | 10/1916 | Sidon | 30/164.95 |
| 2,892,291 | 6/1959 | Coleman | 30/165.95 |
| 4,028,801 | 6/1977 | Gelfman | 30/164.95 |
| 4,203,209 | 5/1980 | Insolio | 30/164.95 |
| 4,215,472 | 8/1980 | Raven | 30/164.95 |

*Primary Examiner*—Jimmy C. Peters

*Attorney, Agent, or Firm*—Albert F. Kronman

[57] ABSTRACT

A hand tool for cutting or scoring glass in which an elongated rigid finger piece is provided with an elongated handle secured at one end and a glass scoring member at its opposite end. The finger piece is of somewhat triangular cross section with a flattened top portion and inwardly curved side portions. A cross bar on the finger piece between the handle end of the finger piece and the handle extends outwardly on each side of the finger piece. In use the handle is slipped between the index and middle fingers of the user until the cross bar bears against the palm and the index and middle fingers bear against the top of the finger piece. The finger piece is then grasped between the user's thumb and ring fingers within the inwardly curved side portions.

9 Claims, 6 Drawing Figures

HAND HELD GLASS CUTTER

BACKGROUND

In cutting glass to a desired dimension or configuration, it is first necessary to score the surface of the glass continuously along a desired line or path. Thereafter, the glass will fracture along the score upon the application of a slight pressure, impact or torque. Hand held tools or glass cutters useful for scoring the glass surface have been made in a variety of shapes and sizes to suit the preferences and comfort of the user. Such hand held devices generally consist of an elongated handle having a holder at one end to receive a glass scoring member such as a wheel or tip and a finger gripping portion on the handle adjacent to the scoring member. The pressure necessary to score the glass is applied to the scoring member by the worker's fingers upon the gripping portion.

The amount of pressure applied in scoring the glass surface is often a matter of personal preference, some workers using a substantially greater pressure than others. Elements of fatigue also enter into the amount of pressure applied to the cutting member, particularly when a large number of cuts are made over a period of time. Another factor giving rise to fatigue in prior art hand held glass cutters is the rather cramped position which must be taken by the user's fingers upon the gripping portion during the scoring operation.

Accordingly, it is an object of the present invention to provide a hand held glass cutter which will overcome many of the disadvantages of prior art glass cutters.

Another object of the present invention is to provide a glass cutter which is suitable for the application of a wide variety of glass scoring pressures.

A further object of the present invention is to provide a hand held glass cutter in which the pressure applying fingers of the user's hand are extended in a natural position.

Still another object of the present invention is to provide a glass cutter having a cross bar between the finger gripping portion and the handle to urge the cutter forward when cutting is done in a forward direction (away from the user) and to serve as a bearing surface for additional hand pressure applied to the scoring member.

A feature of the present invention is its symmetrical shape which lends itself to use by either left or right handed persons.

SUMMARY

In one preferred embodiment of the present invention, an elongated finger piece is formed with a handle portion extending from one end thereof and a glass scoring member extending from the opposite end of the finger piece. A flattened finger table on the top of the finger piece is adapted to receive the index and middle fingers of the user. Opposed inwardly concave recesses are symmetrically arranged on each side of the longitudinal axis of the finger piece to receive the thumb and ring finger of the user.

A cross bar which may be integral with the finger piece is located between the finger piece and the handle and extends laterally on each side of said finger piece.

When the glass cutting tool is in use, the cross bar bears against the palm of the users hand at the juncture between the palm and the first two fingers. The handle is held between the first two fingers.

BRIEF DESCRIPTION OF THE DRAWINGS

In the accompanying drawings forming part hereof, similar elements have been given the same reference numerals, in which drawings.

GENERAL DESCRIPTION

Figure 1:
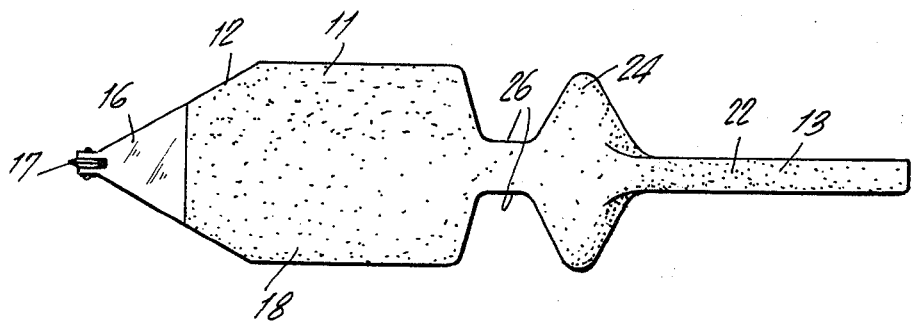
FIG. 1 is a top view of a glass cutting tool in accordance with the present invention.

Referring to the drawings and particularly to FIGS. 1-4, there is shown a glass scoring tool (herein referred to as a glass cutter) made in accordance with the present invention. The glass cutter 10 is made of any suitably rigid material such as metal, plastic, wood or combinations thereof. An elongated block 11 (hereinafter referred to as a finger piece) comprises the major element of the glass cutter 10. The finger piece is tapered at its front, or glass scoring end as indicated at 12. Extending rearwardly of the finger piece and preferably integral therewith is an elongated handle 13 having a substantially round cross-sectional shape of a diameter which may comfortably be held between the index and middle fingers of the user.

The tapered portion of the finger piece is reduced as shown at 14 to receive a stub shaft 15 to secure the glass scoring member holder 16. The scoring member illustrated is a carbide wheel 17 but it is to be understood that any other form of scoring member well-known in the art may also be employed.

Figure 4:
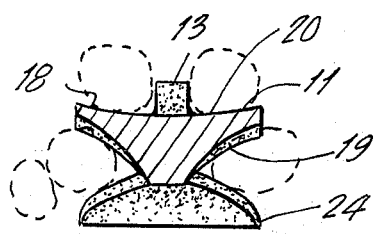
FIG. 4 is a cross sectional view taken on line 4—4 in FIG. 3, looking in the direction of the arrows.

The top of the finger piece 11 is flattened to provide a finger table 18 upon which the user's index and middle fingers are brought to bear when the tool is in use, as shown in dashed lines in FIG. 4. Elongated concave recesses 19 are formed on each side of the longitudinal axis of the finger piece 11 and are symmetrically arranged and angled so as to give the finger piece a somewhat triangular cross-sectional shape as best shown in FIG. 4.

Figure 3:
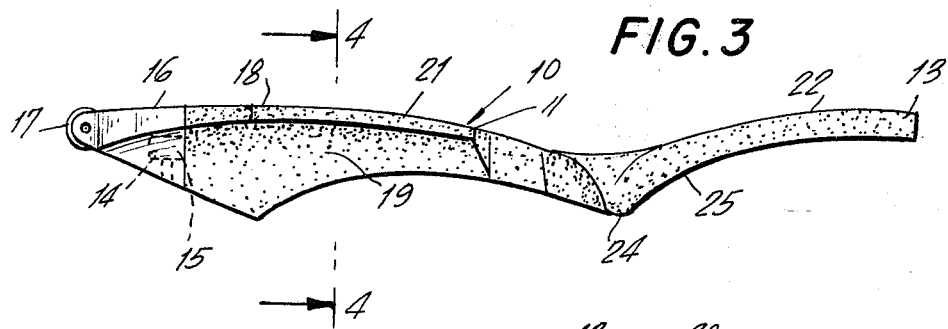
FIG. 3 is a view in side elevation of the tool of FIGS. 1 and 2.

Referring to FIGS. 3 and 4, it will be seen that the finger table 18 is transversely curved at 20 and longitudinally bowed at 21 to conform to the shape of the user's fingers. The elongated concave recesses 19 also form comfortable opposed bearing surfaces for the thumb and third finger of the hand. The handle 13 is both bowed at 22 and angularly disposed with respect to the finger piece 11 as shown at 23 so that it will rest upon the back of the hand when the glass cutter 10 is in use.

Figure 6:
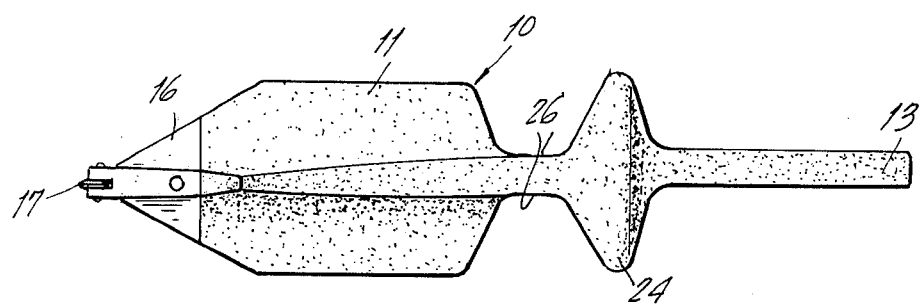
FIG. 6 is a bottom view of the tool shown in FIG. 1.

Additional pressure and control is provided to the user of the glass cutter by means of a cross bar 24, best shown in FIGS. 1 and 6. The cross bar extends laterally from the glass cutter 10 and is located between the finger piece 11 and the handle 13 in a position where it will bear against the palm of the user when the handle 13 is slipped between the index and middle fingers. The cross bar is bowed as shown at 25 to conform to the shape of the user's hand. Cut out portions 26 on the finger piece 11 in front of the cross bar 24 facilitate positioning of the user's thumb and ring finger in the elongated recesses 19.

Figure 2:
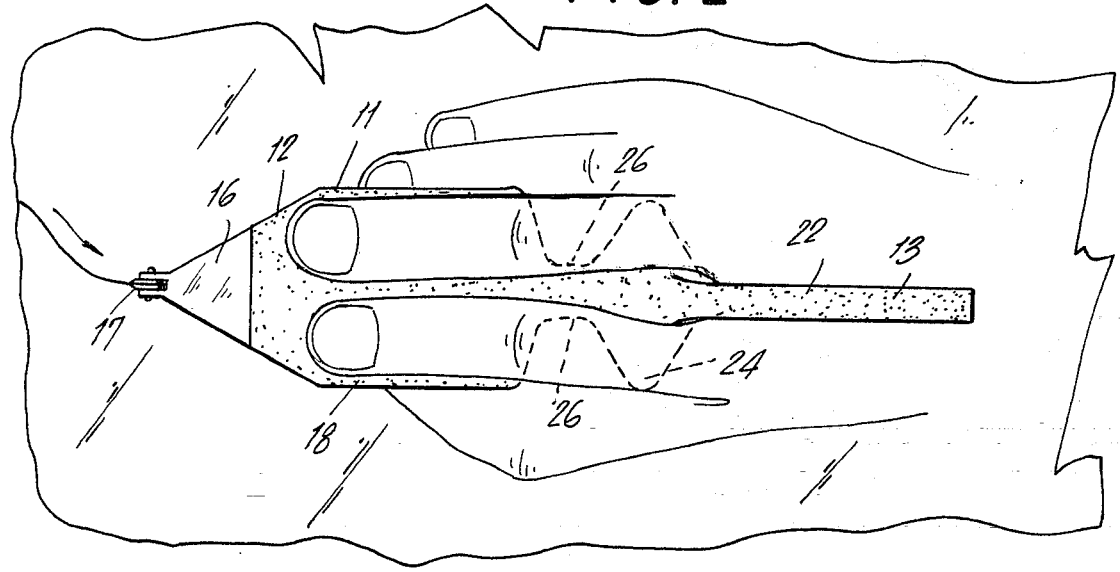
FIG. 2 is a view similar to FIG. 1 showing in dashed lines the position of the user's fingers.
Figure 5:
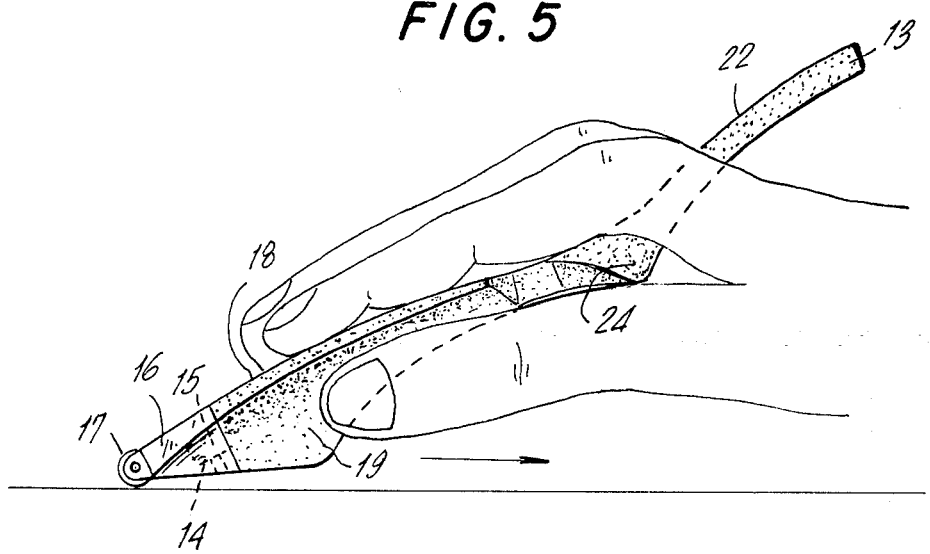
FIG. 5 is a view similar to FIG. 3 showing, in dashed lines, the manner in which the glass cutting tool is held by the user.

The operation of the above described glass cutter will become apparent from the foregoing description and an examination of FIGS. 2 and 5. With the glass cutter 10 grasped as shown in FIGS. 1 and 2, the cutting wheel 17 is brought against the surface of the glass. The desired amount of pressure is applied to the cutting wheel by the user's index and middle fingers to the finger table 18. Additional pressure is applied by the palm of the user bearing against the cross bar 24. The cutting tool 10 may then be drawn across the glass surface toward the user to score the surface or urged across the glass surface away from the user as desired. The path of the score may be controlled by a suitable guide or template or by the movement of the user's hand or fingers.

Having thus fully described the invention, what is desired to be claimed and secured by Letters Patent is:

1. A hand tool for cutting glass comprising an elongated finger piece of somewhat triangular cross section, an elongated handle secured to and longitudinally extending from one end of the finger piece, a glass scoring member extending from the opposite end of the finger piece, a flattened finger table on the top of the finger piece, having a width to receive the index and middle fingers of the user, opposed concave recesses in the sides of the finger piece and a cross bar carried by the finger piece disposed between the finger piece and the handle and extending laterally thereof.

2. A hand tool according to claim 1 in which the handle is of a width to fit between the index and middle fingers of the user.

3. A hand tool according to claim 1 in which the finger table is transversely curved and longitudinally bowed to conform to the index and middle fingers of the user.

4. A hand tool according to claim 1 in which the finger piece is tapered in the direction of the glass scoring member and provided with attachment means to secure the glass scoring member to the finger piece.

5. A hand tool according to claim 1 in which the handle is of a substantially round cross-sectional shape, longitudinally bowed and angularly disposed with respect to the finger piece.

6. A hand tool according to claim 1 in which opposed concave recesses are angularly disposed with respect to each other and the finger table to receive the thumb and third finger of the user.

7. A hand tool according to claim 1 in which the cross bar is integral with the finger piece and bowed to conform to the adjacent portion of the palm of the user.

8. A hand tool according to claim 1 in which the finger piece is formed with cut out portions on each side thereof adjacent the cross bar.

9. A hand tool according to claim 1 in which the glass scoring member is a carbide wheel.

* * * * *